United States Patent [19]

MacCulloch et al.

[11] Patent Number: 5,061,826
[45] Date of Patent: Oct. 29, 1991

[54] HIGH STRENGTH FLEXIBLE HOUSING

[75] Inventors: David B. MacCulloch, Saugus; Danny E. Castleman, Port Hueneme, both of Calif.

[73] Assignee: G & H Technology, Inc., Camarillo, Calif.

[21] Appl. No.: 554,008

[22] Filed: Jul. 17, 1990

[51] Int. Cl.$^5$ ............... H02G 9/00; H02G 1/06; F16G 11/05
[52] U.S. Cl. .................... 174/70S; 29/460; 29/461; 29/525; 138/109; 174/79; 174/89; 285/149; 403/185; 403/275
[58] Field of Search .............. 174/70 S, 79, 89; 29/460, 461, 525; 138/109, 130, 131, 133, 135, 139; 254/134.3 SC; 285/149; 403/185, 215, 216, 275; 455/601

[56] References Cited

U.S. PATENT DOCUMENTS

| | | | |
|---|---|---|---|
| 3,874,064 | 4/1975 | Chevalier | 29/460 |
| 4,166,921 | 9/1979 | Phillips et al. | 174/70 S |
| 4,507,008 | 3/1985 | Adi et al. | 403/275 |

FOREIGN PATENT DOCUMENTS

| | | | |
|---|---|---|---|
| 1458100 | 10/1966 | France | 285/149 |
| 53-21789 | 2/1978 | Japan | 174/89 |

Primary Examiner—Morris H. Nimmo
Attorney, Agent, or Firm—Kenneth J. Hovet

[57] ABSTRACT

A narrow elongated housing is provided constructed of an inner ribbed conduit which is overlaid with two layers of high strength rods. Each layer is contra-helically wrapped with opposing end portions compression secured in a termination chamber. The chamber is formed between a sleeve, which is attached to opposing ends of the conduit, and an outer termination enclosure. With the ends of each layer of rods in the chamber, the enclosure is either held stationary, or slid over the upper layers of rod ends. Concurrently, a wedge is either manually placed in the annular space between the layers and held stationary, or it is forced into the annular space between the layers. Any of the above combination of actions will force the rods against the sleeve and enclosure and frictionally secure them. The wedge may be a malleable metal so that it will cold flow about a portion of the rods. A flexible polymer covering is placed over the assembly to complete the housing.

18 Claims, 3 Drawing Sheets

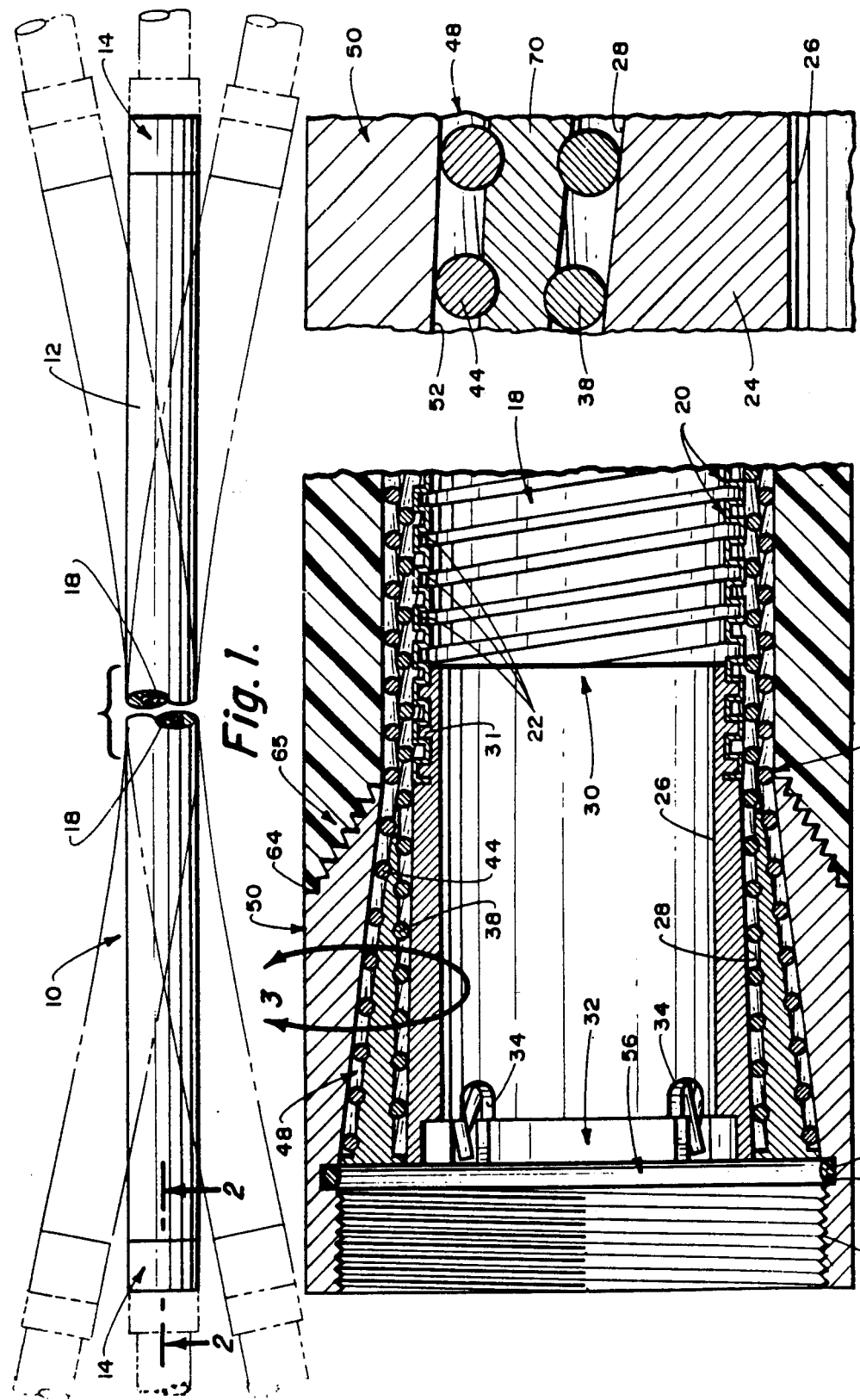

HIGH STRENGTH FLEXIBLE HOUSING

BACKGROUND OF THE INVENTION

1. Field of the Invention

The present invention relates to elongated housings which have high tensile and compression strength while also being flexible.

2. Description of Related Art

Undersea photonics systems require exceptional means for protection against the deep ocean pressures, abrasive underwater structures and saltwater corrosion. Additionally, deployment from moving ships of thousands of miles of optical fiber cable with hundreds of lightwave repeater units require housings for such units that can withstand tensile loads of up to 45,000 lbs. Also, transferring loads between repeater housings and cables require more strength than the prior art cable spicing and clamping techniques provide.

An arrangement for terminating a stranded cable to a large socket is described in U.S. Pat. No. 4,507,008. The cable strands are distributed about a tapered opening in the socket body. A matching plug and malleable sleeve are forced into the opening until the sleeve cold flows about portions of the cable strands. This creates an expanded area of frictional engagement and facilitates the tensile load capability of the connection.

A significant disadvantage of the above arrangement is that it provides no housing at all for the necessary electro-optic instruments required in the aforementioned lightwave repeater units. The socket body terminates the cable strands, but it provides nothing for transferring tensile loads through an elongated housing (typically 5-15 feet long).

Further, such housings must be flexible so they can be wound upon, transported and unwound from large spools. The aforementioned socket body is a solid metal part and is not flexible. The prior art device also leaves the cable strands exposed to the environment and provides no means for corrosion protection of the interior plug, sleeve and cable engagement area.

SUMMARY OF THE INVENTION

A high strength housing and unique method of assembly are provided by the present invention. The housing not only resists the compression forces of great ocean depths, but also has the tensile strength and flexibility to permit deployment from a rotating sheave on a moving ship. And, in addition to all the above, the housing also includes unique means for transferring tensile loads from connected undersea cables through the housing.

Considering that thousands of miles of electro/optic transmission lines are placed along the ocean floor with a repeater unit or other type of instrument housing about every 5-6 miles, the advantages of the invention are enormous. Additional advantages are that the subject housing is sealed and impervious to corrosion, is abrasion-proof and, has a useful life equivalent to the transmission cables themselves.

The high strength flexible housing of the invention comprises an interior flexible conduit of predetermined length having opposing ends to which are attached sleeves. Two layers of flexible high strength rods are placed in a cross-over pattern around the conduit and sleeves. A termination enclosure is then positioned over each end portion of the above assembly forming a termination chamber between the sleeve and termination enclosure. An insert is located between the rod layers and the chamber volume is reduced to compress the rods against the insert and between the sleeve and termination enclosure. The normal compression loading force is effective to hold the rods in place against high tensile loads from transmission lines which are attached to the termination enclosure by means known in the art.

BRIEF DESCRIPTION OF THE DRAWINGS

FIG. 1 is a side elevation view of the high strength housing of the invention showing its flexibility in phantom.

FIG. 2 is an enlarged cross-sectional view taken along lines 2—2 of FIG. 1.

FIG. 3 is an enlarged fragmentary view taken along line 3 of FIG. 2.

DESCRIPTION OF THE PREFERRED EMBODIMENTS

Figure 4:
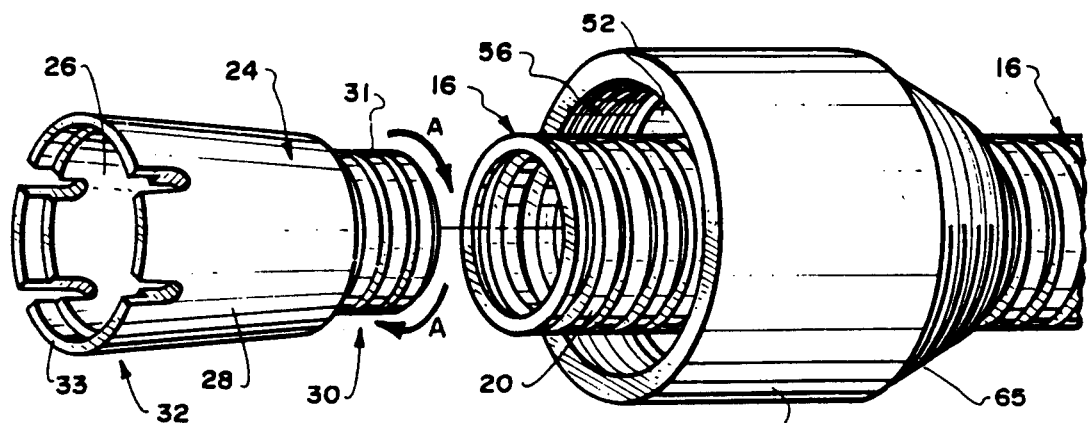
FIG. 4 is a fragmentary partially exploded perspective view showing attachment of the sleeve to one end of the conduit with the termination enclosure backed-away from the conduit end.

With reference now to the drawings, the high strength housing of the invention is shown in FIG. 1 by reference 10. It includes an elongated body 12 having a rod termination assembly 14 at each opposing end. The termination assemblies are identical to each other and a description of one applies equally to the other. The overall construction of the housing is tubular, but could be oval or polygonal depending on the particular end use and environment in which it is used.

Flexible conduit 16 generally defines the hollow interior 18 and basic shape of the housing. Specific conduit diameters and lengths are chosen to accommodate whatever electro/optic instruments and circuitry are being housed. For some lightwave repeater units, the housing length is about twelve feet with a three inch diameter.

As shown in the drawings, conduit 16 comprises a thin-walled tubular member constructed of an endless strip of spirally-wound beryllium copper (BeCu). Other metals and composite materials could be used as dictated by the environment and physical requirements of how and where the housing will be used.

The conduit walls are formed into ribs 20 having a polygonal-shaped cross-section. They extend spirally about the conduit periphery and are heat treated to resist radial crushing forces. The inner and outer rib corners 22 function as predetermined flexure locations when the conduit is bent. This allows the conduit to easily flex without having its wall collapse or becoming ruptured. This, in turn, prevents displacement of the conduit center axis and maintains a uniform interior diameter throughout the length of the conduit.

Sleeve 24 is an annular-shaped non-deformable metal part having an inner wall 26 which is about coextensive with the conduit inner diameter. It includes an outer surface 28 which, as shown at its innermost end portion 30, is provided with threads 31. As depicted by arrows A,A in FIG. 4, the sleeve threads rotatably engage the corresponding spiral ribs 20. It will be appreciated that other types of attachment means could be utilized such as welding, clamping rings, stay pins, lock keys and bolts.

The outer surface 28 extends axially to an outermost end portion 32 which may include optional cable notches 34. The notches are used for engagement with corresponding pins on external transmission cable parts. In this way torque may be transferred between the cables and the housing.

Figure 9:
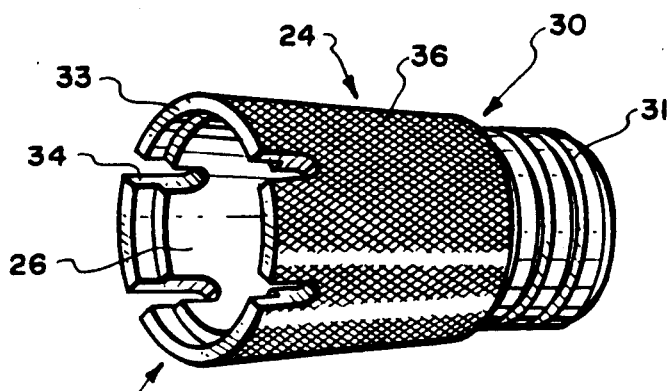
FIG. 9 is a perspective view of the sleeve of the invention having a knurled outer surface.

The sleeve outer surface constitutes the bottom wall of a termination chamber and provides a surface for frictional engagement with inner rods 38. It may taper outwardly to enhance the above engagement. It is also helpful to knurl at least part of the sleeve outer surface. With reference to FIG. 9, a knurled outer surface 36 is depicted which is used to enhance frictional engagement with the inner rods.

A first layer of inner rods 38 overlies the conduit and sleeve outer surface. The rods are positioned about parallel to each other and preferably have a uniform spacing and diameter. Each one is a continuous length extending to about the sleeve outermost end 32. That part of each rod in both layers that overlies outer surface 28 is defined as end portion 40.

Figure 5:
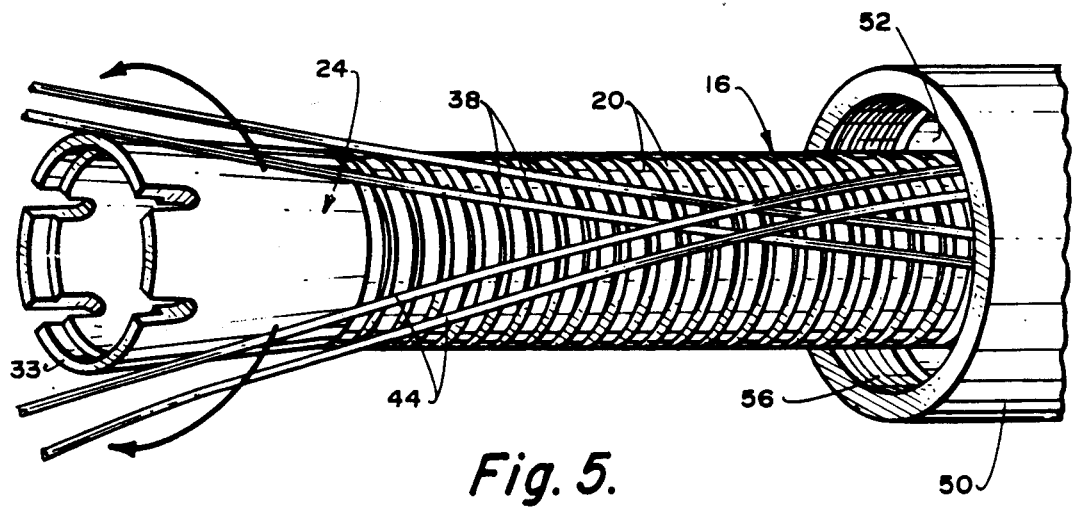
FIG. 5 is a perspective view of the assembly of FIG. 4 further depicting placement of representative first and second rod layers contra-helically wrapped over the conduit and sleeve.

As illustrated in FIG. 5, each rod extends helically at least twice around the conduit. This is to prevent differential loading when flexed under high tensile loads. The preferred range of encirclements is 2, 3 or 4 complete wraps around the conduit.

A second layer of outer rods 44 is wrapped helically in a direction opposite the direction of inner rods 38. As such, they overlie and crossover the first layer of rods. They extend between the opposing outermost sleeve end portions and encircle the conduit (and first layer) at least twice in the same manner as the inner rods. Their spacing, number and diameter should be similar to the first layer rods, or at least the total cumulative tensile strength of each layer should be balanced. This is to ensure that the opposing torque from each layer will be about equal and cancel each other out when an axial tensile load is applied to the housing.

The rods in both layers may be preformed prior to their placement over the conduit. Although the rods are flexible, they are hard and not readily bent. They are constructed of high strength metal, such as BeCu alloy, and may be heat treated to have a tensile strength of 100-120 kpsi.

Figure 6:
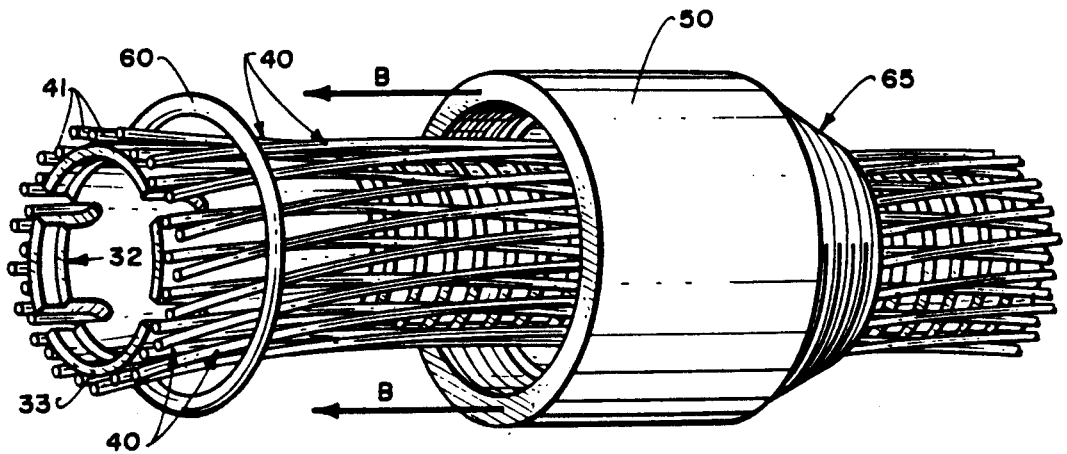
FIG. 6 is a perspective view of the assembly of, FIG. 5 showing completion of rod wrapping and movement of the termination enclosure toward the rod end portions to form a termination chamber with the sleeve.

Upon completion of the rod wrapping steps, termination enclosure 50 is moved axially, as shown by arrows B,B in FIG. 6, toward the sleeve outermost end portion 32. Depending on the relative diameters involved, it will be appreciated that the enclosure part may be positioned about the conduit either before or after the rod lay-up steps.

The enclosure conforms to the cross-sectional shape of the sleeve and conduit. Preferably, it is ring-like in shape with an interior diameter defined by inner surface 52. The inner surface is hard and non-deformable, like outer surface 28. It may taper outwardly from throat region 54 proximate innermost end portion 30 to the transition region 56 axially outward from outermost end portion 32. Preferably, the inner and outer surfaces diverge from each other for insertion of a compression means to be hereinafter described. The transition region includes annular groove 58 for O-ring 60 and threads 62 for a sealing connection with external cable parts (not shown).

The exterior walls of the enclosure throat region include an outer abutment shoulder 64 from which extends a downwardly inclined serrated area 65. The serrated area provides an embedment means for anchoring protective covering 66 which sealingly encompasses the rods and conduit.

Referring back to FIG. 6, the enclosure 50 is moved axially until it is above at least a major portion of the sleeve. In many cases, it may be manually positioned so that the termination region will extend axially beyond the sleeve terminus 33. In this location, the outer surface 28 and inner surface 52 will be about coextensive.

The interior diameter of the enclosure is such that in any of the above positions, the inner surfaces will loosely engage the outer rods 44. The annular space that is formed thereby between the inner and outer surfaces is denoted as termination chamber 48.

After the termination chamber has been formed, the next step is to place an insert between the rod layers and forcibly compress the rods of each layer against respective inner and outer surfaces. This may be accomplished with various types of compression means such as beveled rings, wedge parts, cam mechanisms or tapered sleeves.

Figure 7:
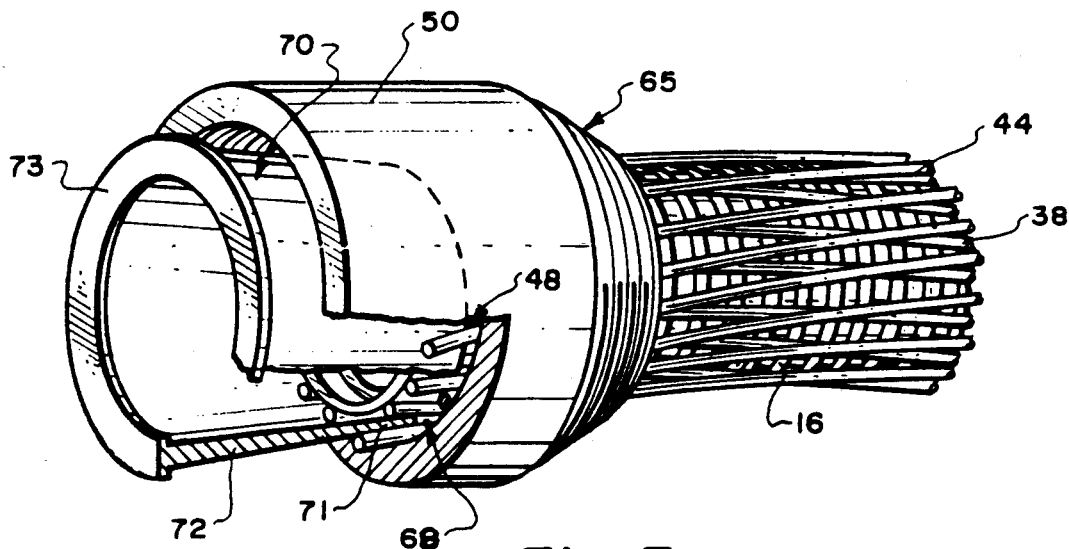
FIG. 7 is a perspective view of the completed assembly of FIG. 6 illustrating positioning of an insert into the termination chamber between the two layers of rods.

With reference to FIG. 7, the compression means comprises an annular-shaped tapered insert or wedge 70. It has a thin front portion 71 and a thickened back portion 72 which terminates at an outwardly facing flange 73. The wedge is preferably constructed of a malleable material which is capable of cold flow when forced against a harder material. The front portion of the wedge is inserted into the annular space 68 between of inner and outer rods. Then, while the enclosure is held against rearward movement, the wedge is forced axially into the annular space. As the thicker portion of the wedge moves into the space, the rods of each layer will diverge and be compressed against the respective adjacent inner and outer surfaces. Simultaneously, the outer end portions of the hard rods will indent the softer wedge material as illustrated in FIG. 3. This action will increase the surface area of contact between the wedge and rods which, in turn, will greatly improve the frictional engagement therebetween.

Preferably, the wedge cross-section, wall surface spacing and degree of divergence are properly coordinated to permit the wedge to be fully inserted as shown in the drawings. In such case, flange 73 will be about flush with terminus 33 of outermost end portion 32 and the terminal end 41 of all the rods.

The compression step may be carried out with a prior art power clamping means (not shown) having a jaw which can engage abutment shoulder 64. Simultaneously, a ram will engage face flange 73 and drive the wedge into the chamber.

It can be seen that the above actions could be reversed whereby the ram is stationary and the jaw draws the enclosure toward the wedge. Also, any combination of the above could occur depending on the relative friction forces that may exist between the rods and surfaces, the type of clamping apparatus being utilized and the relative axial positions of the wedge and enclosure.

In all cases, the free volume of the termination chamber is lessened by entry of the wedge and/or outward movement of the termination enclosure. Reduction of the volume functions to constrain the rods against the surfaces and create a normal frictional force which will be adequate to prevent disengagement when maximum tensile loads occur via connection of the termination enclosure to external transmission lines and cables.

Figure 8:
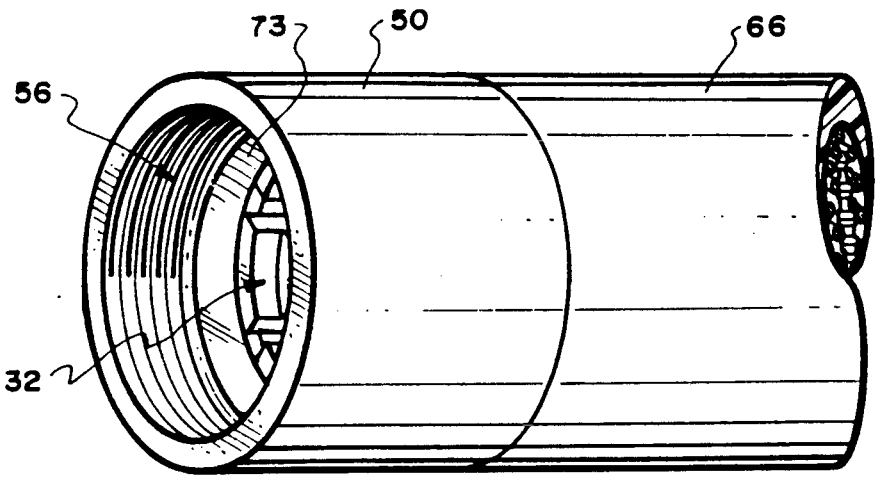
FIG. 8 is a fragmentary perspective view of the complete compression-fitted assembly as constructed by the steps depicted in FIGS. 4-7, including a protective covering over the rods and conduit.

Upon completion of the rod compression step, the area between the opposing termination assemblies 14 is protected with a durable waterproof covering 66 shown in FIG. 8. The covering must be flexible and capable of sealing against water leakage for several decades after the housing is placed on the ocean floor. It also functions as a cushion for the outer strength rods and provides a gripping surface which is useful during transmission line deployment and recovery operations. Preferably, the covering comprises a castable polymer such as polyurethane which can be reaction-set with a catalyst.

While the foregoing description sets forth the embodiments of the invention in specific detail, it will be apparent that variations, alterations and/or modifications may be made without departing from the spirit and scope of the invention. Accordingly, the invention is not to be limited to the aforementioned specific details, but only by the scope of the appended claims.

We claim:

1. A high-strength flexible housing comprising:
    a sleeve attached to each end of said conduit, each sleeve having an innermost end portion and an outermost end portion and an outer surface;
    a first layer of flexible inner rods wrapped helically about said conduit and each sleeve outer surface;
    a second layer of flexible outer rods wrapped helically across said inner rods along about the same axial extent as said inner rods, said inner and outer rods encircling said conduit at least twice with each layer having predetermined overall strength characteristics to provide about an equal and opposite torque when an axial tensile load is applied to said housing;
    termination enclosures each having an inner surface which forms a predetermined annular chamber with a respective sleeve outer surface, said inner and outer surfaces diverging from a throat region proximate said sleeve innermost end portion toward a transition region proximate said sleeve outermost end portion; and,
    said inner rods and outer rods each having end portions which extend into said chambers and are frictionally engaged with said respective inner and outer surfaces by forced insertion of a respective insert between said inner and outer rods.

2. The housing of claim 1 wherein each insert is tapered from a thickened portion adjacent said transition region to a thin portion proximate said throat region.

3. The housing of claim 1 wherein each insert is indented by said inner and outer end portions as a result of said forced insertion.

4. The housing of claim 1 wherein at least a part of each said outer surface is knurled to enhance frictional engagement with said inner rods.

5. The housing of claim 1 wherein said conduit is constructed of spiral rods having a polygonal cross-section.

6. The housing of claim 5 wherein said inner rods and outer rods have a uniform diameter and are uniformally spaced apart.

7. The housing of claim 1 wherein said inner and outer rods have a terminal end adjacent said transition region.

8. A method of producing a high-strength flexible housing comprising:
    providing a flexible conduit;
    connecting a sleeve to each end of said conduit;
    wrapping a plurality of inner rods around said conduit and sleeves;
    wrapping a plurality of outer rods across said inner rods;
    positioning a termination enclosure over opposing end portions of said rods and each of said sleeves;
    positioning a respective wedge into the respective annular space between the opposing end portions of said inner and outer rods; and,
    forming a frictional engagement between each termination enclosure and said outer rods and between each sleeve and said inner rods by pressing respective opposing end portions against each of said wedge, sleeve and termination enclosure.

9. The method of claim 8 including the step of covering said rods and conduit between opposing termination enclosures with a flexible material.

10. The method of claim 8 including the steps of wrapping said inner rods at least twice around said conduit and wrapping said outer rods at least twice around said inner rods.

11. The method of claim 8 wherein each termination enclosure has an inner surface that inclines outwardly, each pressing step being performed by forcing said termination enclosure outwardly against the end portions of said outer rods while preventing outward movement of said wedges.

12. A method of forming a high-strength flexible housing comprising:
    providing a flexible conduit;
    attaching a sleeve with an outer surface to each end of said conduit;
    cross wrapping two layers of rods over said sleeves and conduit with opposing end portions of said rods being located above said sleeves;
    positioning a termination enclosure having an outwardly inclined inner surface over each said end portions to form a termination chamber between each said outer surface and inner surface;
    placing a respective tapered insert between said rod layers adjacent the rod end portions; and,
    forcing said end portion into frictional engagement with said outer and inner surfaces by reducing the volume of each said chamber.

13. The method of claim 12 including the step of covering both of said layers and conduit with flexible material.

14. The method of claim 12 wherein the volume of each said chamber is reduced by moving a respective termination enclosure axially outward relative to said rods, wedge and sleeve.

15. The method of claim 12 wherein said two layers of rods comprise a first layer of inner rods, said inner rods being positioned to extend helically at least twice around the conduit and a second layer of outer rods, said outer rods being positioned to crossover and extend contrahelically to said first layer and encircle said conduit at least twice.

16. The method of claim 15 including the step of preforming said inner rods and said outer rods prior to their assembly with said conduit and sleeves.

17. The method of claim 15 including the step of forming peripheral ribs with a polygonal cross-sectional shape in said conduit.

18. The method of claim 12 wherein the rods of each layer are positioned to be uniformally spaced apart and are selected to provide each layer with about an equal and opposite torque when an axial tensile load is applied to said housing.

* * * * *